United States Patent [19]

Malcolm-Brown

[11] Patent Number: 4,581,866
[45] Date of Patent: Apr. 15, 1986

[54] PROTECTION OF EXPANDED MATERIAL AND OTHER FLAMMABLE MATERIALS OF LOW COMPRESSION STRENGTH FROM FIRE, ESPECIALLY IN STRUCTURAL BEARINGS

[75] Inventor: Tessa Malcolm-Brown, Pampisford, England

[73] Assignee: Dixon International Limited, Great Britain

[21] Appl. No.: 538,781

[22] Filed: Oct. 4, 1983

[30] Foreign Application Priority Data

Oct. 4, 1982 [GB] United Kingdom ............... 8228286
Jun. 24, 1983 [GB] United Kingdom ............... 8301849

[51] Int. Cl.$^4$ ............................ E04B 1/68; E04B 1/94
[52] U.S. Cl. .................................... 52/232; 52/309.4; 52/309.8; 52/396
[58] Field of Search ............... 52/232, 309.4, 167, 52/396, 309.8

[56] References Cited

U.S. PATENT DOCUMENTS

| | | | |
|---|---|---|---|
| 3,354,594 | 11/1967 | Kilcher | 52/396 X |
| 3,934,066 | 1/1976 | Murch | 428/248 |
| 4,265,963 | 5/1981 | Matalon | 428/288 |
| 4,367,295 | 1/1983 | Von Bonin | 521/165 |

FOREIGN PATENT DOCUMENTS 2334332 1/1975 Fed. Rep. of Germany ........ 52/167
1601131 10/1981 United Kingdom .

Primary Examiner—Alfred C. Perham
Attorney, Agent, or Firm—Wegner & Bretschneider

[57] ABSTRACT

A structural bearing is disclosed which comprises a bearing unit, intumescent material spaced from at least one side of the bearing unit to be protected from fire, and expanded plastics material which is of low compression strength relative to the bearing unit, adjacent to the one side of the bearing unit and disposed between the one side of the bearing unit and at least part of the intumescent material, the intumescent material being adjacent to the expanded plastics material.

7 Claims, 6 Drawing Figures

PROTECTION OF EXPANDED MATERIAL AND OTHER FLAMMABLE MATERIALS OF LOW COMPRESSION STRENGTH FROM FIRE, ESPECIALLY IN STRUCTURAL BEARINGS

The present invention relates to the protection of expanded plastics material and other flammable materials of low compression strength from fire.

It is well known that expanded plastics material, such as expanded polystyrene, are highly flammable. Consequently the use of such materials often present a fire hazard and their use in many situations where, apart from their flammability, they would be highly suitable is precluded.

We have now surprisingly discovered that it is possible to reduce substantially or prevent burning of expanded plastics material and other flammable materials of low compression strength when exposed to fire. In particular, we have found quite unexpectedly that intumescent material can prevent expanded plastics materials, such as polystyrene, which are normally highly flammable, and other flammable materials of low compression strength, from burning. Thus the fire hazard presented by use of such materials can be substantially reduced and they can be used in situations even where there is a fire risk.

One particular application of the invention is in relation to structural bearings, in particular for building but also including bridge bearings.

Known structural bearings comprise one or more bearing units which are disposed in use between a lower supporting part of a structure and an upper supported part of the structure. The bearing units may be individual resilient modular elements, each of which is to bear directly on the lower supporting part and to be borne upon directly by the upper supported part of the structure, or may each be a stack of resilient modular elements which are all keyed together or may be a sliding bearing unit or a gliding bearing unit.

For ease of installation it is conventional for the structural bearing to comprise, in addition to the one or more bearing units, a filler material of low compression strength relative to the bearing units and surrounding the bearing units at their sides. The filler material can act as a guide to enable the bearing to be accurately positioned on the lower supporting part of the structure during installation. The filler material also acts as a spacer enabling the upper supported part of the structure to be cast in situ with a uniform gap maintained between the upper and lower parts of the structure.

When the bearing is installed between the two parts of the structure, the load is taken by the bearing unit or units which are free to absorb horizontal and rotational displacement of the upper supported part effectively without hindrance by the filler material. Two layers of sheet material may be adhered to the upper and lower surfaces of the bearing unit or units and the filler material so as to form the bearing unit into a unitary assembly which can be easily handled and installed. These sheets are normally paper, at least the upper sheet normally being waterproofed.

The filler material is usually expanded polystyrene in the form of a slab or sheet having a through aperture or apertures therein and in which the bearing unit or units are located.

In the event of fire in or adjacent a building structure incorporating a bearing as above described, the bearing is likely to be destroyed or damaged by the heat of the fire. The polystyrene used as filler material is highly flammable and if it catches fire, the degree of damage to the bearing will be increased.

There is accordingly a need for a structural bearing which is resistant to damage by fire.

In accordance with the present invention there is provided an article comprising a body of expanded plastics material or other flammable material of low compression strength and, at or adjacent a surface of the body, intumescent material, the intumescent material serving to prevent the body burning or to reduce the flammability of the body at that surface.

There is further provided in accordance with the invention a method of treating at least one surface of a body of expanded plastics material or other flammable material of low compression strength to prevent it burning or to reduce the flammability of the body at that surface, comprising applying to that surface intumescent material. The intumescent material may be applied in the form of a coating or covering to the surface.

The expanded plastics material may be expanded polystyrene or expanded polyurethane.

The body of expanded plastics or other flammable material may have the intumescent material at or adjacent all its surfaces or only a surface or surfaces particularly likely to be exposed to fire.

The intumescent material may be adhered to the expanded plastics or other flammable material and may be so formulated as to be self-adherent to such material.

The intumescent material may be applied to the expanded plastics material by coating a liquid composition onto the plastics material, the composition being such that it sets or otherwise hardens, on exposure to air and/or as a result of reaction within the composition, to form the intumescent material. The liquid composition to be coated onto the plastics material may be pasty or in the form of a slurry.

Alternatively an intumescent mastic may be coated onto the expanded plastics material.

By "intumescent material" we mean material which when exposed to elevated temperature, as under fire conditions, expands at least slightly, for example, to twice to five times its original volume, to form a coherent heat-resistant mass or solid foam. Preferably the material expands whilst undergoing endothermic reaction and preferably the coherent mass or solid foam is of low thermal conductivity such that heat is transmitted only very slowly through the intumescing or intumesced material.

Preferably the intumescent material used in the present invention, comprises essentialy four components, namely a carbonific, a spumific, an activator and a binder.

The carbonific is a source of carbon char when the intumescent material is subjected to heat. It is an important constituent of the foam that is formed when the intumescent material is exposed to elevated temperature. The carbonific may be one or more of mono-, di- and tri-pentaerythritols, sucrose and starch.

The spumific decomposes under fire conditions and releases gases which cause the carbon char to expand. The spumific may be dicyandiamide or guanidine.

The activator is a material that promotes the decomposition of the carbonific and the spumific. The activator may be monoammonium phosphate.

The binder serves to hold the other components of the intumescent material together. The binder may be an amino resin such as unreaformaldehyde resin or, preferably, melamine formaldehyde resin. When the binder is an amino resin it also acts to some extent as a carbonific and spumific.

More preferably the intumescent material is made from the following ingredients in the stated parts by weight (p.b.w.) weight or percentages by weight.

| Water-soluble or dispersible melamine-formaldehyde (MF) resin | 3400–4200 p.b.w. | 28–42% |
|---|---|---|
| Pentaerythritol | 650–950 p.b.w. | 7–11% |
| Monoammonium phosphate | 3800–4600 p.b.w. | 31–47% |
| Dicyandiamide | 1600–2400 p.b.w. | 14–22% |
| Total | 10800 p.b.w. | 100% |

In this formulation, at least some of the dicyandiamide reacts with the MF resin to cross-link the resin.

Preferably, the ingredients, in powder form, of the intumescent material may be mixed with water, e.g. to give a paste or slurry, coated onto the body of expanded plastics material or other flammable material of low compression strength, and the mix allowed to set or harden to form the intumescent material.

It is found that when the surface of an article according to the invention, the intumescent material being at or adjacent that surface, is subjected to flame, burning of the plastics material or other flammable material does not readily occur. Instead as the expanded plastics or flammable material collapses the intumescent material expands to fill the voids left by the collapsing material and to prevent access of atmospheric oxygen to the remaining plastics or flammable material. Thus the plastics or flammable material does not readily catch light.

We envisage that the invention will enable expanded plastics material to be used as thermal and sound insulation in situations where previously the use of such material has not been possible on account of the fire hazard present by the material.

The invention is illustrated by the following example.

EXAMPLE

Two expanded polystyrene slabs were taken, each approximately 30×15×6 cm.

The following materials, in powder form, were mixed together in the stated amounts together with an amount of water sufficient to form a paste or slurry;

| Water soluble or dispersible melamine-formaldehyde resin powder | 3800 g |
|---|---|
| Pentaerythritol | 800 g |
| Monoammonium phosphate | 4200 g |
| Dicyandiamide | 2000 g |

The resulting paste or slurry was coated onto one of the slabs. The paste or slurry was allowed to harden and mature for a week to form a coating of intumescent material about 2 to 3 mm thick and which was self-adherent to the slab.

An oxy-acetylene flame was then played onto both slabs. The uncoated slab caught fire and burned away within a few seconds. The surface of the coated slab onto which the flame played turned black as the intumescent material intumesced but the slab did not catch light. The volume of the slab, as the expanded polystyrene slowly collapsed over a prolonged period, became filled with intumesced material consisting mainly of black carbonific char.

The hardening and maturing of the paste or slurry coated onto the slab could have been hastened by gentle heating.

As mentioned above, the invention is of particular applicability to structural bearings.

In accordance with the present invention, there is provided a structural bearing comprising a bearing unit, intumescent material spaced from at least one side of the bearing unit to be protected from fire, and filler material, which is of low compression strength relative to the bearing unit, adjacent to or in contact with said side of the bearing unit and disposed between said side of the bearing and all or part of the intumescent material, the intumescent material being adjacent to or in contact with the filler material.

When the bearing is installed between upper and lower structural parts, the expansion of the intumescent material assists in sealing any gaps which may develop between either structural part and the filler material to prevent flame or hot gases penetrating to the bearing unit.

The filler material is preferably expanded polystyrene (or other olefinic polymer) conveniently in the form of a slab having a through aperture in which the bearing unit is located.

In installing a bearing according to the invention, the bearing should be selected such that the intumescent material is directed outwardly relative to the bearing unit on all sides of the bearing unit to be protected against fire.

Conveniently, as mentioned above, the bearing unit is disposed in a through aperture in an expanded polystyrene slab. The slab may be surrounded by intumescent material along all sides of the slab. Where the bearing is elongate, e.g. for laying along the top of a wall, the slab may be in the form of a strip having a plurality of spaced through apertures, in each of which a respective bearing unit is located, the intumescent material being disposed along opposite sides of the strip and optionally also at the ends of the strip.

Sheet material, such as paper sheet, may be adhered to the upper and lower surfaces of the intumescent material, the filler material and the bearing unit to make the bearing unit a unitary assembly. Preferably the sheet material or at least the upper sheet is waterproof.

The intumescent material is preferably intumescent mastic. Suitable mastic is further described below.

The intumescent material may be present in a single channel or groove formed in the filler material or may be present in a plurality of channels or grooves in the filler material. Such grooves may be formed for example in the upper and/or lower surfaces of the intumescent material.

The invention is further described below by way of example with reference to the accompanying drawings, wherein.

Figure 1:
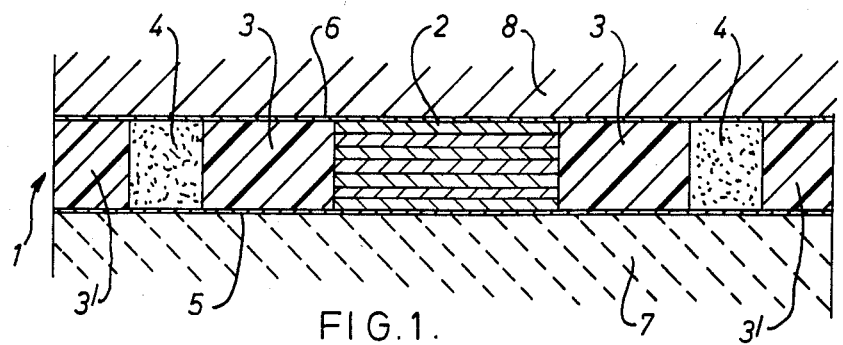
FIG. 1 is a sectional view of a structural bearing according to the invention, the bearing being shown in position in a building.

Referring to FIG. 1, a structural bearing 1 comprises a bearing unit 2, expanded polystyrene filler material 3, intumescent material 4 and further expanded polystyrene filler material 3'.

The bearing unit 2, the filler material and the intumescent material are adhered, at their lower surfaces, to a paper carrier sheet 5, and at their upper surfaces, to a paper carrier sheet 6.

The bearing is shown installed in a building, supported on a wall 7 and supporting a slab or beam 8 (hereinafter referred to as a slab for convenience).

The bearing unit 2 supports the vertical load of the slab 8 and absorbs horizontal and rotational movements of the slab 8 relative to the wall 7.

The bearing unit 2 may be elongate in the form of a strip so that it can extend along the top of the wall 7 as shown in FIG. 1. Alternatively a plurality of separate bearing units could be provided for positioning at intervals along the top of the wall 7 (although for convenience we generally refer herein to the bearing unit in the singular).

The expanded polystyrene filler material 3 and 3' is of low strength and compressibility relative to the bearing unit 2. Thus the filler material 3 and 3' supports effectively none of the load of the slab.

The filler material 3 may be a polystyrene sheet or slab with an aperture cut in for the locating of the bearing unit 2. Where there are a plurality of bearing units 2, a like number of apertures would be provided for the location of the bearing units. Alternatively separate strips of polystyrene sheet material may be positioned at the sides of the bearing unit. Similarly the filler material 3' may be a polystyrene sheet or slab with an aperture or apertures cut therein for accommodating the intumescent material 4, the filler material 3 and the bearing unit 2 or may consist of strips of polystyrene positioned around the bearing.

At the outside edges of the filler material 3, the intumescent material 4 is provided. Thus the bearing unit 2 is enclosed within the polystyrene filler material 3, which is itself enclosed within the intumescent material 4. The intumescent material 4 is surrounded by the filler material 3'.

The width of the bearing 1 is selected to be the same as the width of the wall 7. In installing the bearing, after erection of the wall 7, the bearing is placed along the top of the wall, with its sides flush with the sides of the wall so that the bearing unit 2 is disposed centrally of the top of the wall. The slab 8 may then be cast in situ. The filler material 3 and 3' and the intumescent material are able to support the weight of the concrete from which the slab 8 is cast while setting but thereafter, as additional load is imposed on the slab, the load of the slab is borne substantially wholly by the bearing unit as described above.

The paper sheets 5 and 6 serve to make the bearing 1 into a unitary assembly which can be easily handled during transport and installation. The sheets 5 and 6, especially the upper sheet 6, are preferably of waterproof paper. (E.g. the paper may be waxed). This assists in preventing moisture e.g. from concrete being cast to form the slab 8, penetrating to the bearing unit 2, the filler material 3 and the intumescent material 4.

The sheets 5 and 6 may be provided, on their sides facing the bearing unit 2, with pressure sensitive adhesive so that the unitary assembly of the bearing can be easily manufactured.

In the event of fire, if a conventional bearing were used between the wall 7 and the slab or beam 8 the expanded polystyrene filler material used with conventional bearings would rapidly melt, decompose and burn thereby generating noxious fumes and heat would penetrate between the wall 7 and the slab 8 and damage or even destroy the bearing unit 2. After the fire the bearing would need to be replaced, assuming that the building had remained structurally sound.

When the bearing shown in FIG. 1 is exposed to the heat of a fire, the polystyrene 3' first burns and the intumescent material 4 at least adjacent the fire, assisted by the heat of the burning polystyrene 3', intumesces, that is it expands to form coherent fire-barrier material and swells to seal between the slab 8 and the wall 7. Moreover, we have found quite unexpectedly, that the intumescing material migrates into the polystyrene 3 and appears to undergo reaction with the polystyrene as a result of which the reacted polystyrene even when exposed to air does not burn or lose its integrity and thus continues to resist transmission of heat to the bearing unit 2. Also the intumesced material prevents fumes being released by the filler material 3.

The transmission of heat through the wall 7 and the slab 8 is low and we have further found that even after prolonged exposure to the fire, the bearing unit 2 remains expectedly cool and consequently undamaged.

After the fire, the intumescent material and the reacted polystyrene can be raked out from between the wall 7 and the slab 8 and replaced with fresh polystyrene and intumescent material, or with intumescent material only. The intumescent material is conveniently intumescent mastic which comprises a hard intumescent material in powder form in a non-hardening plastic medium.

Instead of either paper sheet 5 or 6, there may be provided two layers of paper with hard intumescent material or intumescent mastic in between. This intumescent material or mastic will assist in preventing transmission of heat to the bearing unit through building parts 7 and 8 in the event of a fire although of course it cannot be replaced, at least immediately above and below the bearing unit 2, after fire.

The bearing unit 2 may be in any of a variety of forms.

Thus the bearing unit may be constituted by
(1) a single resilient or elastomeric monolithic unit or pad
(2) a plurality of resilient or elastomeric modular elements keyed together
(3) a sliding unit having at least two relatively slidable elements, optionally at least one element of the unit also being resilient
(4) a gliding unit i.e. flat hollow internally lubricated tube
(5) a rocking unit having one element rockable on another element.

FIG. 1 shows the bearing unit 2 in the form of a single elastomeric monolithic unit. This unit may consist of a block of resilient material containing horizontal reinforcements such as metal sheets or fabric.

Figure 2:
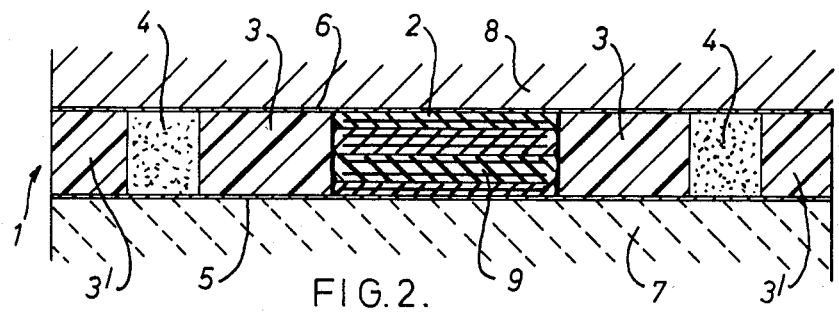
FIG. 2 is similar to FIG. 1 but shows a modular resilient bearing unit comprised in the bearing.

FIG. 2 is similar to FIG. 1, but shows a bearing unit 2 comprising a stack of modular separate elements 9 comprising metal sheets bonded to layers of rubber. The upper and lower elements each comprise a single metal sheet and the intermediate elements comprise a pair of metal sheets separated by a layer of rubber. The metal sheets of each pair of adjacent elements are keyed together.

FIG. 3 is again similar to FIG. 1 but shows a slide bearing unit comprising a lower stationary elastomeric pad 10 having a layer of ptfe (polytetrafluoroethylene) 12 forming its upper surface and an upper elastomeric sliding pad 11 having a layer of ptfe forming its lower surface. The upper pad 11 is slidable on the lower pad 10.

The bearing of all three figures behave similarly in the event of a fire.

Figure 3:
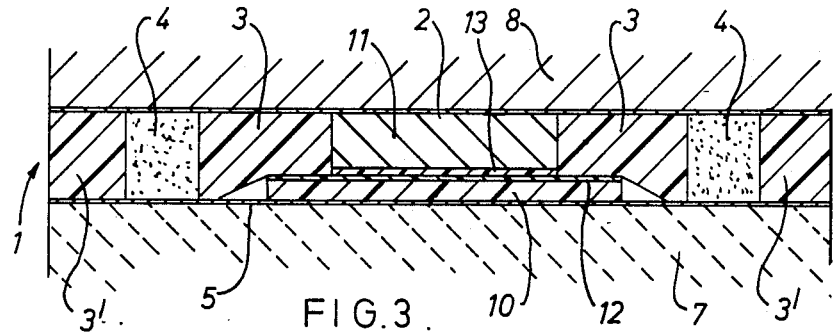
FIG. 3 is also similar to FIG. 1 but shows a sliding bearing unit comprised in the bearing.
Figure 4:
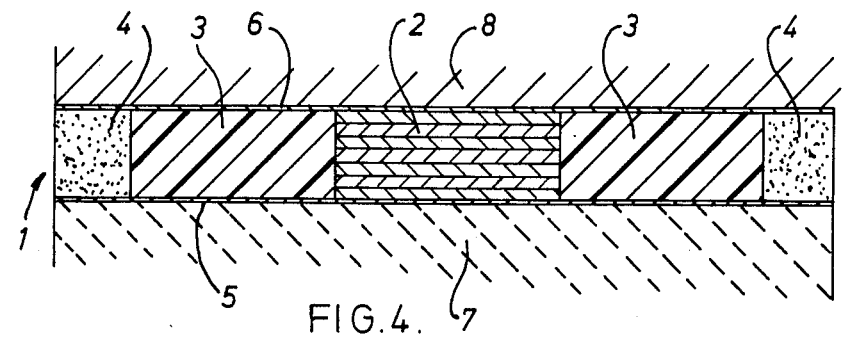
FIGS. 4, 5 and 6 show modifications of the bearings of FIGS. 1, 2 and 3 respectively.
Figure 5:
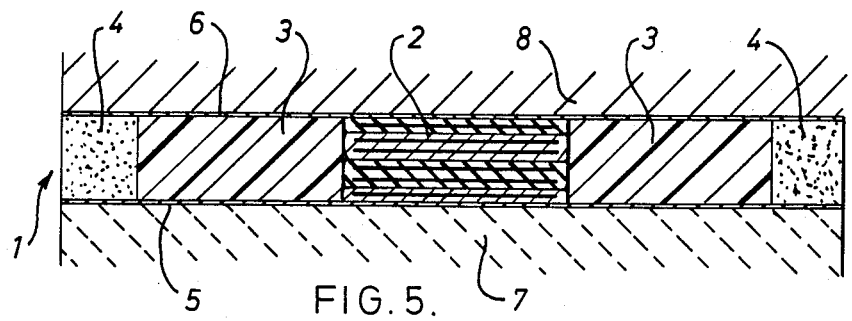
Figure 6:
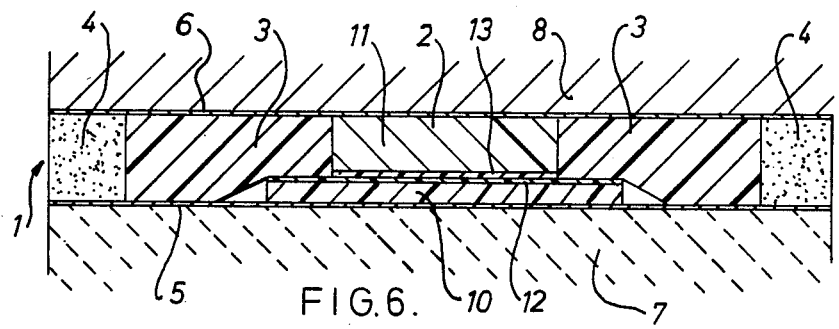

The bearings of FIGS. 3, 4 and 5 are similar in construction, use and behaviour under fire conditions to the bearings of FIGS. 1,2 and 3 respectively except that the filler material 3 is of greater horizontal extent and the intumescent material 4 extends up to the edges of the bearings, the further filler material 4' consequently being omitted.

The intumescent material and intumescent mastic referred to above for use in this invention are preferably based on melamine formaldehyde resin and dicyandiamide or guanidine as crosslinking agent, an ammonium phosphate and pentaerythritol. Suitable non-mastic hard intumescent materials are described in our British patent 1601131, in particular in Example 1 thereof, optionally without wood flour and plaster of Paris. Suitable intumescent mastic may comprise such intumescent material in fine powder form in a non-hardening plastic medium consisting of a mixture of polyvinyl chloride in powder form and a plasticizer.

It may alternatively be possible to use sodium silicate-based intumescent material.

I claim:

1. A structural bearing comprising a bearing unit, intumescent material spaced from at least one side of the bearing unit to be protected from fire and expanded plastics material, which is of low compression strength relative to the bearing unit, adjacent to said one side of the bearing unit and disposed between said one side of the bearing unit and at least part of the intumescent material, the intumescent material being adjacent to the expanded plastics material.

2. A structural bearing according to claim 1, wherein the intumescent material is a mastic.

3. A structural bearing according to claim 1, wherein the intumescent material comprises
   (a) melamine formaldehyde resin;
   (b) ammonium phosphate;
   (c) a carbonific; and
   (d) a cross-linking agent selected from the group consisting of dicyandiamide and guanidine 4. A structural bearing according to claim 3, wherein the filler material is polystyrene and is disposed on both sides of the intumescent material.

5. A structural bearing according to claim 1, wherein the filler material is polyurethane or an olefinic polymer.

6. A structural bearing according to claim 5, wherein the filler material is polystyrene.

7. A structural bearing according to any of claims 1, 5, or 6 wherein the bearing unit is disposed in a through aperture in a slab of the filler material.

* * * * *